(12) United States Patent
Suzuki et al.

(10) Patent No.: US 12,011,992 B2
(45) Date of Patent: Jun. 18, 2024

(54) TANK ATTACHMENT STRUCTURE (71) Applicant: HONDA MOTOR CO., LTD., Tokyo (JP)

(72) Inventors: Shunta Suzuki, Tokyo (JP); Keisuke Kato, Tokyo (JP); Shohei Tsukamoto, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 158 days.

(21) Appl. No.: 17/584,425

(22) Filed: Jan. 26, 2022

(65) Prior Publication Data

US 2022/0258599 A1 Aug. 18, 2022

(30) Foreign Application Priority Data

Feb. 15, 2021 (JP) ................................. 2021-021805

(51) Int. Cl.
*B62D 65/02* (2006.01)
*B60K 15/063* (2006.01)
(Continued)

(52) U.S. Cl.
CPC .......... *B60K 15/067* (2013.01); *B60K 15/063* (2013.01); *B60K 15/07* (2013.01);
(Continued)

(58) Field of Classification Search
CPC .... B60K 15/067; B60K 15/063; B60K 15/07; B60K 2015/0634; B62D 25/20; B62D 65/024
See application file for complete search history.

(56) References Cited

U.S. PATENT DOCUMENTS 7,270,209 B2 * 9/2007 Suess ............... B60K 15/03006
224/538
7,819,431 B2 * 10/2010 Minami ............... B60K 15/067
280/834
(Continued)

FOREIGN PATENT DOCUMENTS

JP 04-123819 11/1992
JP 09-300988 11/1997
(Continued)

OTHER PUBLICATIONS

Japanese Notice of Allowance for Japanese Patent Application No. 2021-021805 mailed Feb. 21, 2023.
(Continued)

*Primary Examiner* — Ryan J. Walters
(74) *Attorney, Agent, or Firm* — Amin, Turocy & Watson, LLP (57) ABSTRACT

The tank attachment structure includes a floor panel (2) having a raised portion (11) and an opening (12) protruding toward a passenger compartment, a tank (4) disposed inside the raised portion (11), a plurality of upper bands (5) configured to cover the tank (4) from above, a lower plate (6) connected to the upper bands (5), and a pair of cross members (3) provided in front of and behind the tank (4) and extending in the vehicle width direction. The lower plate (6) has a width dimension greater than that of the upper bands (5) in a vehicle width direction and is provided by the number smaller than that of the upper bands (5) to cover the opening (12). A front end portion (26) and a rear end portion (28) of the lower plate (6) are attached to the pair of cross members (3), respectively.

8 Claims, 6 Drawing Sheets

(51) Int. Cl.
*B60K 15/067* (2006.01)
*B60K 15/07* (2006.01)
*B62D 25/20* (2006.01)

(52) U.S. Cl.
CPC ........... *B62D 25/20* (2013.01); *B62D 65/024* (2013.01); *B60K 2015/0634* (2013.01)

(56) References Cited

U.S. PATENT DOCUMENTS

| | | | | |
|---|---|---|---|---|
| 8,579,331 | B2* | 11/2013 | Hayashi | H01M 8/04201 |
| | | | | 280/830 |
| 8,672,359 | B2* | 3/2014 | Ohashi | B62D 25/20 |
| | | | | 280/834 |
| 8,944,469 | B2* | 2/2015 | Mulanon | F17C 13/084 |
| | | | | 280/834 |
| 8,960,344 | B2* | 2/2015 | Ozawa | B60K 15/03006 |
| | | | | 180/68.5 |
| 10,780,777 | B2* | 9/2020 | Sawada | B60K 15/067 |

| | | | |
|---|---|---|---|
| 2006/0033322 | A1 | 2/2006 | Suess |
| 2012/0080250 | A1 | 4/2012 | Ohashi |
| 2014/0224562 | A1 | 8/2014 | Ozawa et al. |

FOREIGN PATENT DOCUMENTS

| | | |
|---|---|---|
| JP | 2000-085382 | 3/2000 |
| JP | 2000-219161 | 8/2000 |
| JP | 2000-343960 | 12/2000 |
| JP | 2006-123590 | 5/2006 |
| JP | 2014-213817 | 11/2014 |
| JP | 2018-069795 | 5/2018 |
| JP | 2019-104435 | 6/2019 |
| JP | 2020-069829 | 5/2020 |

OTHER PUBLICATIONS

Japanese Office Action for Japanese Patent Application No. 2021-021805 mailed Oct. 4, 2022.
Chinese Office Action for Chinese Patent Application No. 202210049499.X mailed Mar. 16, 2023.

* cited by examiner

TANK ATTACHMENT STRUCTURE

CROSS-REFERENCE TO RELATED APPLICATION

Priority is claimed on Japanese Patent Application No. 2021-021805, filed Feb. 15, 2021, the content of which is incorporated herein by reference.

BACKGROUND OF THE INVENTION

Field of the Invention

The present invention relates to a tank attachment structure.

Description of Related Art

In the related art, vehicles that travel using a gas fuel such as hydrogen gas or the like as a fuel are known. In these vehicles, various technologies for fixing a tank configured to store a gas fuel below a floor panel are proposed.

For example, Patent Document 1 (Japanese Unexamined Patent Application, First Publication No. 2006-123590) discloses a tank attachment structure including a tank disposed below a floor panel, and a pair of bands configured to sandwich the tank from the front and rear or from above and below. When the bands are fixed to a frame member or the like of a vehicle body, the tank is attached to the vehicle body. In addition, the floor panel has a stepped portion and an opening that rise upward to avoid the tank. According to the technology disclosed in Patent Document 1, when the bands are disposed in a groove formed in an outer circumferential portion of the tank, the tank can be securely fixed.

SUMMARY OF THE INVENTION

Here, in a vehicle in which a passenger compartment in the front and a cargo compartment in the rear are separated, even in the case in which the floor panel having the above-mentioned opening is applied, rigidity of the floor panel can be highly maintained by separately installing a reinforcement member or the like on a floor rear portion.

Meanwhile, vehicles having one space in which a passenger compartment space and a cargo compartment space are continuous (for example, a minivan or the like) are known. In these vehicles, it is difficult to dispose a reinforcement member in the floor rear portion. For this reason, the rigidity of the floor rear portion that constitutes the cargo compartment may be borne only by the floor panel. Accordingly, when the floor panel having an opening is applied to such a vehicle, the rigidity of the floor panel may be decreased with respect to a load in a lateral direction occurring in the vicinity of the opening, in particular, upon turning or the like. Further, when a raised portion is provided on the floor panel, the rigidity of the floor panel may be further decreased. Accordingly, the floor panel in the vicinity of the opening may be deformed, and as a result, ride quality for an occupant or operation stability may deteriorate.

Accordingly, when the technology disclosed in Patent Document 1 is applied to a vehicle in which the passenger compartment and the cargo compartment are continuous, there is room for an increase in rigidity of the floor panel and improvement of ride quality for an occupant and operation stability.

Here, the present invention is directed to providing a tank attachment structure capable of increasing rigidity of a floor panel and improving ride quality for an occupant even when the structure is applied to a vehicle in which a passenger compartment and a cargo compartment are continuous.

In order to solve the problems, a tank attachment structure according to the present invention has the following configurations.

(1) A tank attachment structure according to an aspect of the present invention includes a floor panel having a raised portion protruding toward a passenger compartment and an opening directed downward; a tank disposed inside the raised portion; a plurality of upper bands configured to cover the tank from above; a lower plate provided below the tank and connected to the upper bands; and a pair of cross members provided in front of and behind the tank and extending in a vehicle width direction of a vehicle, and the lower plate has a width dimension greater than that of the upper bands in the vehicle width direction and is provided to be fewer in number than the upper bands to cover the opening, and a front end portion and a rear end portion of the lower plate are each attached to the pair of cross members.

(2) In the tank attachment structure according to the aspect of the above-mentioned (1), the lower plate may be formed by overlapping a plurality of plate members in a thickness direction, and in the plurality of plate members, the thickness of the plate member located on the side of the tank may be greatest.

(3) In the tank attachment structure according to the aspect of the above-mentioned (2), when seen in a plan view in a direction perpendicular to a surface direction of the lower plate, a weight-reducing portion that is an inner circumferential portion of the lower plate may be provided on a portion located between the plurality of upper bands.

(4) In the tank attachment structure according to the aspect of the above-mentioned (1), the lower plate may be formed such that a width dimension in the vehicle width direction is increased from the front side toward the rear side.

(5) In the tank attachment structure according to the aspect of the above-mentioned (4), the lower plate may have a convex portion protruding upward, and the convex portion may be formed in a Y shape divided into two from the front side toward the rear side.

(6) In the tank attachment structure according to the aspect of the above-mentioned (2), the plurality of plate members may be constituted by: a first plate member located on the side of the tank; and a second plate member located below the first plate member, the first plate member may have a convex portion protruding upward at a position corresponding to the upper bands in the vehicle width direction, and the second plate member may be formed flat.

(7) In the tank attachment structure according to the aspect of the above-mentioned (6), a thickness of the convex portion may be greater than that of a portion of the first plate member other than the convex portion.

(8) In the tank attachment structure according to the aspect of the above-mentioned (1), the structure may be applied to the vehicle in which a space of the passenger compartment that an occupant enters and a space of a cargo compartment located behind the passenger compartment are continuous.

(9) In the tank attachment structure according to the aspect of the above-mentioned (1), at least one of the pair of cross members may be detachably attached to a vehicle body member.

(10) In the tank attachment structure according to the aspect of the above-mentioned (1), a width dimension of the opening of the floor panel in the vehicle width direction may be greater than that of the lower plate in the vehicle width direction, and an accommodating section in which in-vehicle parts are accommodated may be provided between both sides of the opening in the vehicle width direction and the lower plate.

According to the aspect of the above-mentioned (1), the tank is disposed below the floor panel, and the tank is sandwiched by the plurality of upper bands and the lower plate in the upward/downward direction. The front end portion and the rear end portion of the lower plate are each attached to the pair of cross members. Accordingly, the tank can be fixed to the vehicle.

The floor panel has the raised portion and the opening, and the lower plate is provided to cover the opening of the floor panel. Further, the lower plate has a width in the vehicle width direction that is greater than that of the upper bands, and is provided to be fewer in number than the upper bands. When the opening is covered with the lower plate having a width greater than that of the upper bands, rigidity of the floor panel in the vicinity of the opening can be increased. In particular, rigidity of the floor panel with respect to the load in the lateral direction generated upon turning can be increased. Accordingly, for example, even when the structure is applied to a vehicle in which the space of the passenger compartment and the space of the cargo compartment are continuous, rigidity of the rear portion of the floor panel can be sufficiently highly maintained without separately providing the reinforcement member. Accordingly, in particular, deformation of the floor panel in the vicinity of the opening when the load in the lateral direction is applied can be minimized, and as a result, ride quality for an occupant and operation stability can be improved. Further, since rigidity of the floor panel is increased, the raised portion can be provided on the floor panel. Accordingly, since the tank can be accommodated inside the raised portion, a space below the floor can be effectively used.

Further, since the front end portion and the rear end portion of the lower plate are attached to the cross members having high rigidity, the lower plate can be strongly fixed. Accordingly, rigidity of the floor panel in the vicinity of the opening can be further increased.

Accordingly, even when the structure is applied to a vehicle in which the passenger compartment and the cargo compartment are continuous, it is possible to provide the tank attachment structure capable of increasing rigidity of the floor panel and improving ride quality for an occupant and operation stability.

According to the aspect of the above-mentioned (2), the lower plate is constituted by the plurality of plate members. The thickness of the plate member located on the side of the tank in the plurality of plate members is greatest. Accordingly, the thickness of each of the plate member that receives a load of the tank and the plate member that does not receive the load can be appropriately set, and reduction in weight of the lower plate can be achieved as a whole. Further, when the thickness of the plate member that receives the load of the tank is increased, the load of the tank can be more stably received. Accordingly, both of reduction in weight and guarantee of rigidity can be achieved.

According to the aspect of the above-mentioned (3), the weight-reducing portion is provided on the portion that is the inner circumferential portion of the lower plate and located between the plurality of upper bands. When the weight of the portion that does not directly receive the load of the tank is reduced, further reduction in weight of the lower plate can be achieved while minimizing a decrease in rigidity.

According to the aspect of the above-mentioned (4), the lower plate is formed such that the width dimension in the vehicle width direction is increased from the front side toward the rear side. Accordingly, an area of the lower plate can be increased, and rigidity of the floor panel in the vicinity of the opening in the lateral direction can be increased. When the width dimension of the rear end portion is greater than that of the front end portion, in particular, rigidity of the floor rear portion, rigidity of which is easily decreased, can be increased. Accordingly, rigidity of the floor panel can be improved effectively. Since the end portion of the lower plate in the vehicle width direction is an oblique line, for example, the load transmitted from the lower plate to the cross members is distributed in the forward/rearward direction and the vehicle width direction. Accordingly, the load generated in the vicinity of the opening of the floor panel can be efficiently transmitted to the cross members. Accordingly, deformation of the lower plate and the floor panel can be effectively minimized.

According to the aspect of the above-mentioned (5), the lower plate has the convex portion, and the convex portion is formed in a Y shape divided into two from the front side toward the rear side. Accordingly, the load in the lateral direction can be effectively distributed not only by the oblique line of both sides of the lower plate in the vehicle width direction but also by the convex portion. Accordingly, rigidity of the lower plate can be more effectively increased, and the load in the lateral direction can be supported. Since the convex portion is formed in the Y shape, in the rear end portion of the lower plate having the width dimension greater than that of the front end portion, more parts with high rigidity can be provided. Accordingly, rigidity of the lower plate can be increased throughout the surface.

According to the aspect of the above-mentioned (6), the plurality of plate members that constitute the lower plate are constituted by the first plate member located on the side of the tank and the second plate member located below the first plate member. The first plate member has the convex portion protruding upward at the position corresponding to the upper bands in the vehicle width direction. When the convex portion is provided on the first plate member, the load of the tank can be received by an apex portion (an upper surface) of the convex portion. Since the convex portion is provided at the position corresponding to the upper bands, the tank can be held in the upward/downward direction at substantially the same position in the vehicle width direction. Accordingly, in comparison with the case in which the tanks are held by the upper bands and the lower plate from the different positions in the vehicle width direction, the tank can be stably held. Accordingly, fixing strength of the tank can be improved.

The first plate member is formed in a complex shape having a convex portion, and the second plate member has a flat shape. For this reason, it is possible to provide a simple mold configured to mold the second plate member. Accordingly, manufacturing properties can be improved, and manufacturing costs can be minimized. Further, since the lower plate is constituted by the plurality of plate members, the thickness of each plate member can be reduced. Accordingly, even manufacturing of the first plate member having a complex shape in comparison with the second plate member can be easily performed in comparison with the case in which the thickness is great. Further, in comparison with the case in which the lower plate is constituted by one plate member with a great thickness, reduction in weight of the lower plate can be achieved as a whole.

According to the aspect of the above-mentioned (7), the thickness of the convex portion of the first plate member is greater than that of the portion of the first plate member other than the convex portion. When the thickness of the convex portion that receives the load of the tank is formed great, the load of the tank can be more stably supported. Accordingly, fixing strength of the tank can be improved. Meanwhile, since the portion other than the convex portion is thinner than the convex portion, an excessive increase in weight can be minimized. Accordingly, when only the thickness of the necessary portion is increased, fixing strength of the tank can be improved while minimizing an increase in weight.

According to the aspect of the above-mentioned (8), the tank attachment structure is applied to the vehicle in which the space of the passenger compartment that an occupant enters and the space of the cargo compartment located behind the passenger compartment are continuous. Accordingly, in particular, it can be a useful tank attachment structure when applied to the vehicle in which rigidity of the floor rear portion is easily decreased. Specifically, for example, even when guarantee of rigidity of the floor panel due to the reinforcement member or the like is difficult (a degree of arrangement freedom of the reinforcement member is low), deformation of the floor panel in the vicinity of the opening with respect to the load in the lateral direction can be effectively minimized, and ride quality for an occupant can be improved.

According to the aspect of the above-mentioned (9), at least one of the pair of front and rear cross members is detachably attached to the vehicle body member. Accordingly, the cross members can be attached to the opening of the floor panel at an arbitrary position in the forward/rearward direction in manufacture. That is, for example, in comparison with the case in which the cross members are fixed to the vehicle body member through fusion or the like, a degree of arrangement freedom of the cross members can be increased. Accordingly, for example, when the position of the cross members is adjusted according to the size of the tank, the size of the opening, or the like, rigidity of the floor panel can be adjusted to an appropriate magnitude. Accordingly, versatility of the tank attachment structure can be improved.

According to the aspect of the above-mentioned (10), the width dimension of the opening of the floor panel is greater than that of the lower plate. The accommodating section is provided between both sides of the opening in the vehicle width direction and the lower plate. The accommodating section is provided at the position corresponding to the opening of the floor panel. Accordingly, a region in the vicinity of the opening can be used as the accommodating section. In-vehicle parts such as a suspension or the like are accommodated in the accommodating section. Accordingly, the configuration of the vehicle body rear portion can be made compact using the space in the vicinity of the opening effectively. Further, a degree of design freedom in the rear portion of the vehicle body can be improved.

DETAILED DESCRIPTION OF THE INVENTION

Hereinafter, an embodiment of the present invention will be described with reference to the accompanying drawings. In the following description, directions of forward, rearward, leftward, rightward, upward and downward coincide with forward, rearward, leftward, rightward, upward and downward directions of a vehicle (not shown) to which a tank attachment structure 1 is attached. The leftward/rightward direction may be referred to as a vehicle width direction. An arrow FR in the drawings indicates a forward direction with respect to a vehicle body, an arrow UP indicates an upward direction with respect to the vehicle body, and an arrow LH indicates a leftward direction with respect to the vehicle body.

(Tank Attachment Structure)

Figure 1:
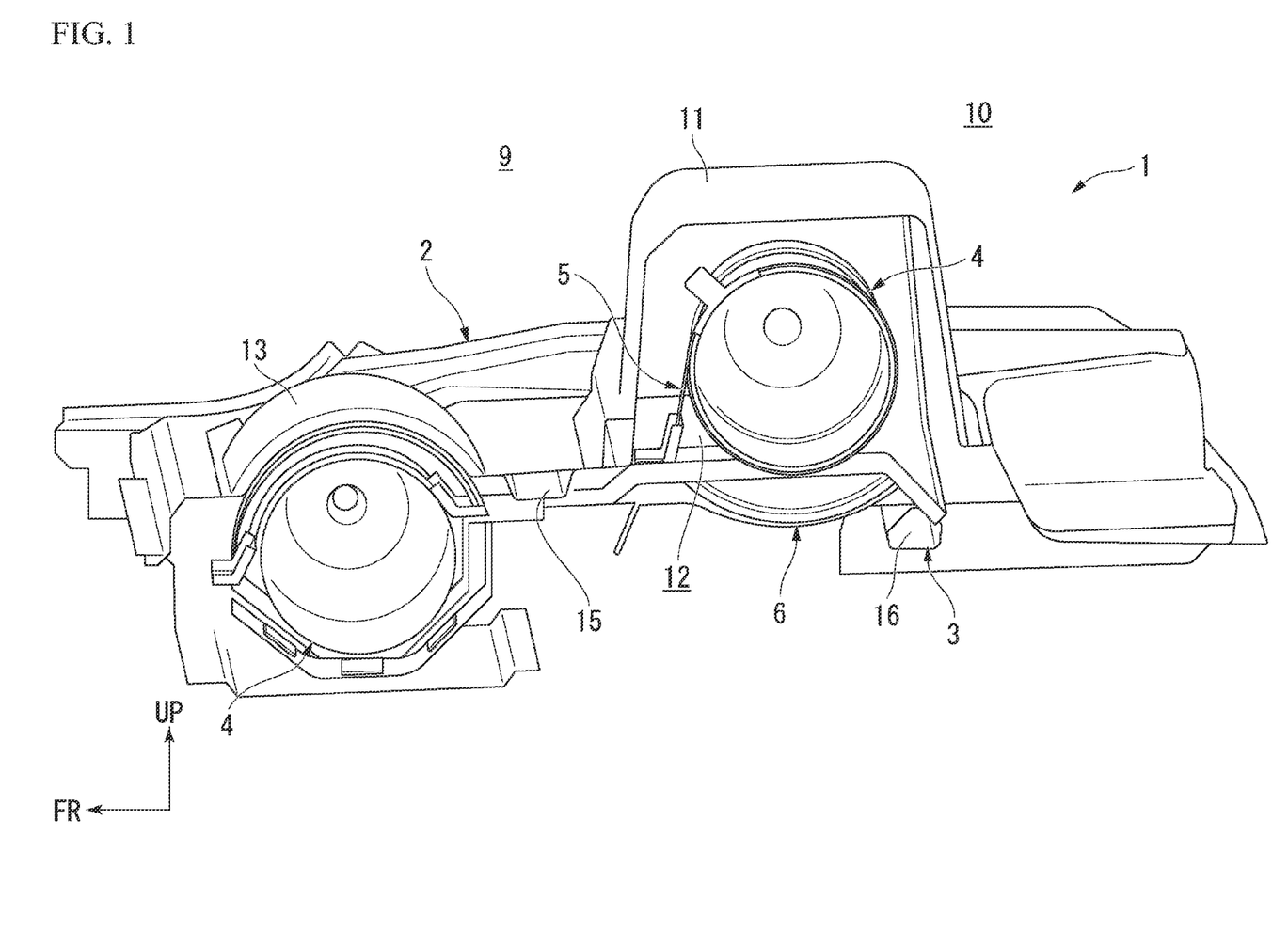
FIG. 1 is a cross-sectional perspective view of a tank attachment structure according to an embodiment in a vehicle width direction.
Figure 2:
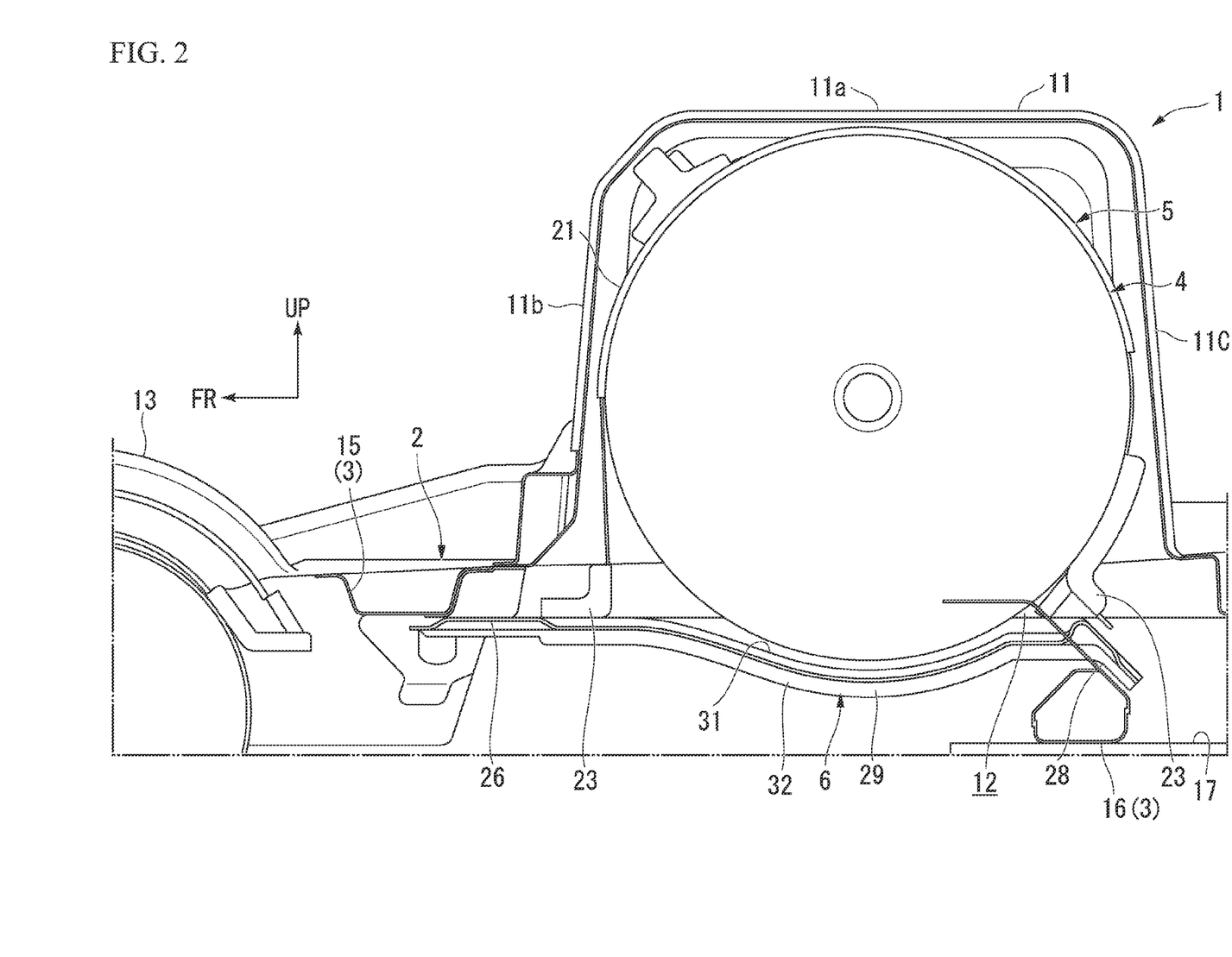
FIG. 2 is a cross-sectional view of the tank attachment structure according to the embodiment in the vehicle width direction.

FIG. 1 is a cross-sectional perspective view of the tank attachment structure 1 according to the embodiment in the vehicle width direction. FIG. 2 is a cross-sectional view of the tank attachment structure 1 according to the embodiment in the vehicle width direction. In FIG. 2, of two tanks 4 mounted on the vehicle, the tank 4 on the rear side is enlarged and shown.

As shown in FIG. 1, the tank attachment structure 1 is provided on a lower portion of the vehicle (not shown) such as an automobile or the like. The vehicle is, for example, a natural gas vehicle that travels using a gas fuel such as natural gas, hydrogen gas, or the like, as fuel, a fuel cell vehicle that travels using electric power generated by a fuel gas, or the like. The tank attachment structure 1 is an attachment structure configured to mount (fix) the tanks 4 filled with a gas fuel on the vehicle.

The tank attachment structure 1 of the embodiment is applied to, for example, a vehicle in which a space of a passenger compartment 9 that an occupant enters and a space of a cargo compartment 10 disposed behind the passenger compartment 9 are continuous (for example, a minivan or the like). In other words, the tank attachment structure 1 is configured such that the tanks 4 can be attached while securing rigidity of the floor in the vehicle in which the passenger compartment 9 and the cargo compartment 10 are not discriminated and rigidity of a floor rear portion is borne by only the floor. The tank attachment structure 1 includes a floor panel 2, a cross member 3, the tanks 4, an upper band 5, a lower plate 6, and an accommodating section 7 (see FIG. 6).

(Floor Panel)

The floor panel 2 is provided on a lower portion of the vehicle and constitutes a floor surface of the passenger compartment 9. The floor panel 2 is provided between a pair of left and right side sills 53 (see FIG. 3). The pair of side sills 53 extend in the forward/rearward direction of the vehicle. Both end portions of the floor panel 2 in the vehicle width direction are fixed to the side sills 53.

The floor panel 2 is formed to have at least one raised portion (in the embodiment, a raised portion 11 and a small raised portion 13) and an opening 12 as the panel member is bent. In the embodiment, the floor panel 2 has the raised portion 11 on the rear side and the small raised portion 13 on the front side. The small raised portion 13 is provided at a position corresponding to the passenger compartment 9 in the forward/rearward direction of the vehicle. The small raised portion 13 protrudes upward (inward in the passenger compartment 9) and opens downward. The raised portion 11 is provided behind the small raised portion 13. The raised portion 11 is provided between the passenger compartment 9 and the cargo compartment 10 in the forward/rearward direction. The raised portion 11 has the opening 12 protruding upward (on the side of the passenger compartment 9) and opens downward. An upward protrusion amount of the raised portion 11 is greater than a protrusion amount of the small raised portion 13. As shown in FIG. 2, the raised portion 11 is formed in a rectangular shape having an upper wall 11a, a front wall 11b and a rear wall 11c when seen in a side view in the vehicle width direction. Specifically, the tanks 4, which will be described below, are disposed below the floor panel 2 and inside the small raised portion 13 and the raised portion 11.

Further, in the following description, a structure in which the tank 4 is attached to the raised portion 11 behind the floor panel 2 will be described as the tank attachment structure 1, and description of the tank 4 disposed on the small raised portion 13 may be omitted.

(Cross Member)

The cross member 3 is a strength member that constitutes a skeleton of the vehicle. The cross member 3 is provided as a pair in front of and behind the tanks 4. The cross member 3 has a front cross member 15 and a rear cross member 16.

As shown in FIG. 2, the front cross member 15 is provided below the floor panel 2, in front of the raised portion 11 and behind the small raised portion 13. The front cross member 15 extends in the vehicle width direction (see also FIG. 6). Both end portions of the front cross member 15 in the vehicle width direction are connected to the pair of left and right side sills 53 (see FIG. 6) via brackets. An upper portion of the front cross member 15 is connected to a lower surface of the floor panel 2.

The rear cross member 16 is provided below the floor panel 2. The rear cross member 16 is provided at a position corresponding to the rear wall 11c of the raised portion 11 of the floor panel 2 in the forward/rearward direction. The rear cross member 16 extends in the vehicle width direction. Both end portions of the rear cross member 16 in the vehicle width direction are connected to the pair of left and right side sills 53 via brackets, respectively. A connecting member 17 extending in the forward/rearward direction is connected to the rear cross member 16. A front end portion of the connecting member 17 is connected to a lower surface of the rear cross member 16. A rear end portion of the connecting member 17 is connected to a rear panel (not shown) connected to a rear portion of the floor panel 2. Accordingly, the rear cross member 16 is connected to the rear panel via the connecting member 17.

At least one of the pair of cross members 3 (the front cross member 15 and the rear cross member 16) is detachably attached to vehicle body members. In the embodiment, the vehicle body members are the floor panel 2 and the side sills 53. That is, the pair of cross members 3 are detachably attached to the floor panel 2 or the side sills 53. In the embodiment, both of the front cross member 15 and the rear cross member 16 are also detachably attached to the floor panel 2 or the side sills 53. Specifically, the front cross member 15 is detachably attached to the floor panel 2. The rear cross member 16 is detachably attached to the side sills 53. That is, the front cross member 15 and the rear cross member 16 are detachably attached to the floor panel 2 using a configuration fastened by bolts (not shown) other than welding, fusion, or the like, with respect to the floor panel 2 and the side sills 53.

(Tank)

The tanks 4 are provided below the floor panel 2. The tanks 4 are filled with a fuel gas such as hydrogen gas, natural gas, or the like. Each of the tanks 4 is formed in a cylindrical shape. The tank 4 is disposed in a state in which a central axis of a cylinder is in the vehicle width direction. In the embodiment, the plurality of (two) tanks 4 are provided. The configurations of the two tanks 4 are the same as each other. The two tanks 4 are disposed inside the small raised portion 13 and the raised portion 11, respectively.

As shown in FIG. 1, the two tanks 4 are disposed at different heights below the floor panel 2. Specifically, the tank 4 on the front side disposed in the small raised portion 13 has a central axis that is disposed below a reference surface on which the raised portion 11 of the floor panel 2 is not provided when seen in a side view. In the tank 4 on the front side when seen in a side view, about ⅓ of the tank 4 in the height direction is accommodated in the small raised portion 13.

Meanwhile, the tank 4 on the rear side disposed in the raised portion 11 has a central axis that is located above the reference surface of the floor panel 2 when seen in a side view. As shown in FIG. 2, when seen in a side view, substantially the entirety of the tank 4 on the rear side is accommodated in the raised portion 11. Accordingly, the tank 4 on the rear side disposed in the raised portion 11 is disposed above the tank 4 on the front side disposed in the small raised portion 13.

(Upper Band)

Figure 3:
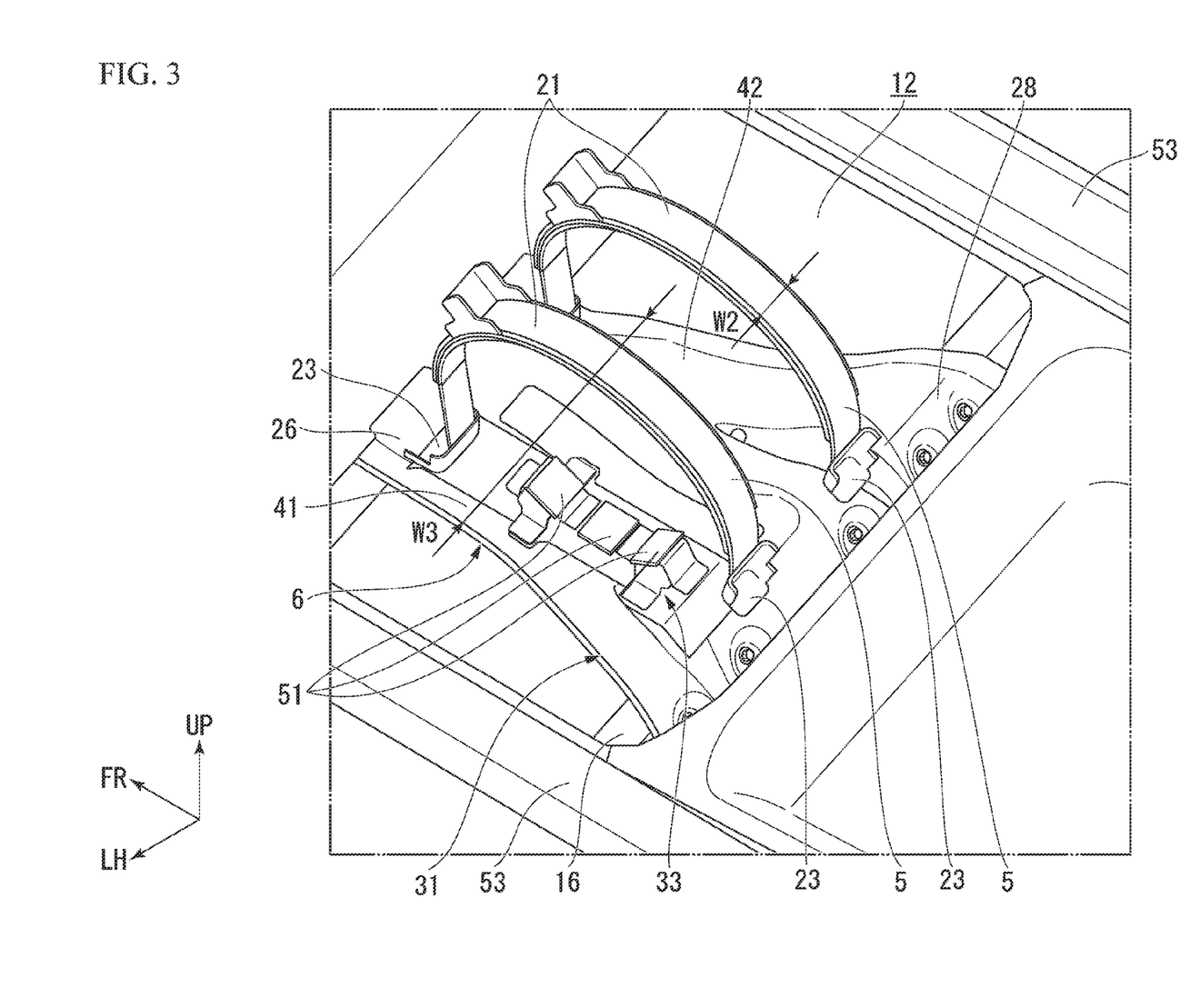
FIG. 3 is a perspective view showing an opening of a floor panel according to the embodiment from above.

FIG. 3 is a perspective view showing the opening 12 (of the raised portion 11 disposed on the rear side) of the floor panel 2 according to the embodiment when seen from above.

As shown in FIG. 2 and FIG. 3, the plurality of (in the embodiment, two) upper bands 5 are provided at an interval in the vehicle width direction. The upper bands 5 have the same configuration and cover the tanks 4 from above. The upper band 5 has a band main body 21 and a band attachment portion 23.

The band main body 21 is formed in a belt shape extending in the forward/rearward direction. The band main body 21 covers an outer circumferential portion of the tank 4 while being curved in an arc shape along an outer circumferential portion of the tank 4.

The band attachment portion 23 is provided at both end portions of the band main body 21. The band attachment portion 23 attaches the band main body 21 to the lower plate 6, which will be described below. The upper band 5 is attached to the lower plate 6, the lower plate 6 is attached to the vehicle body, and thus, the tanks 4 are fixed to the vehicle body. Further, for example, the upper band 5 may not have separately an adjustment mechanism or the like that adjusts the length of the band main body 21 according to the size of the tank 4.

(Lower Plate)

Figure 4:
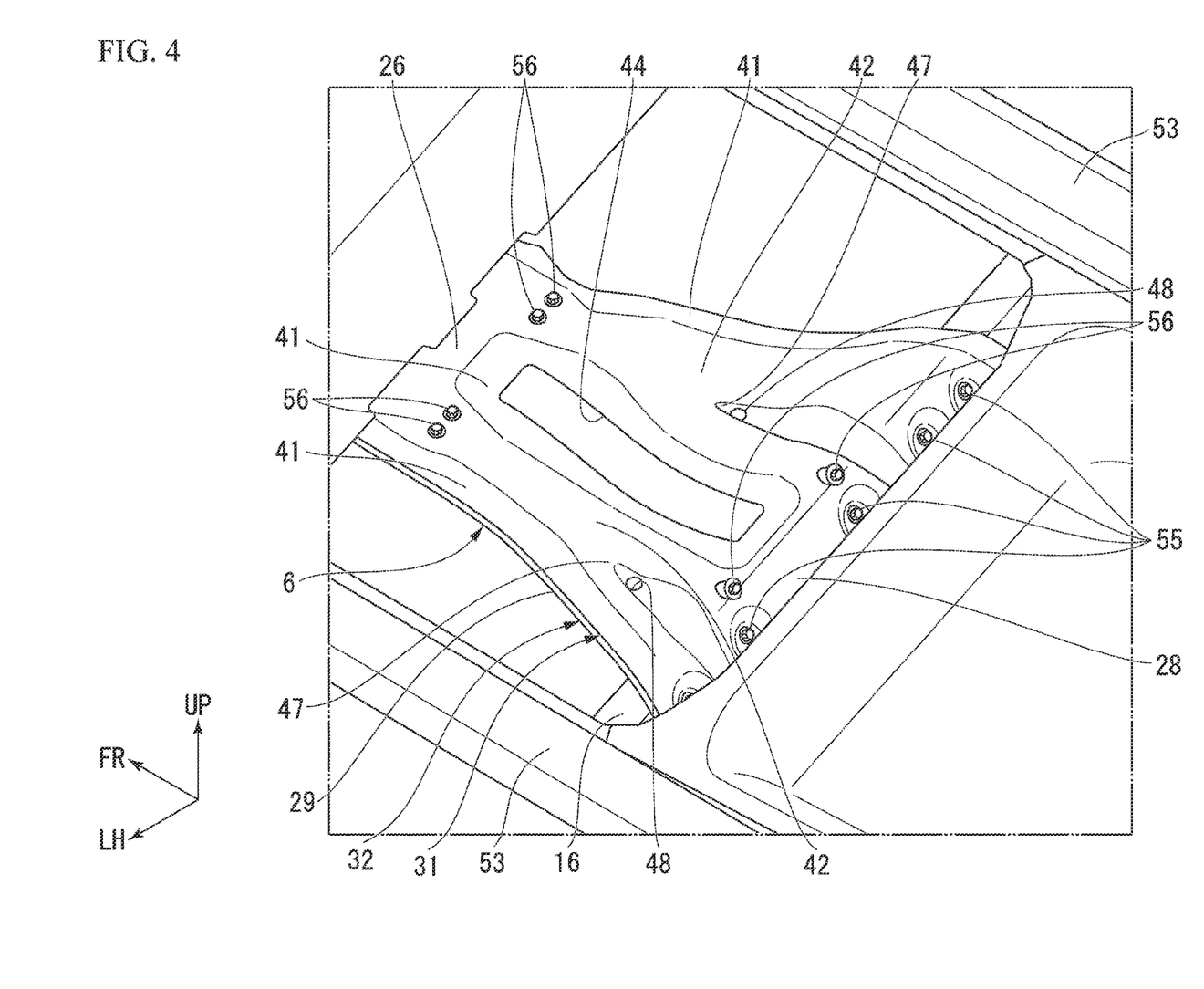
FIG. 4 is a perspective view of the floor panel of FIG. 3, parts such as an upper band or the like of which are not shown.
Figure 5:
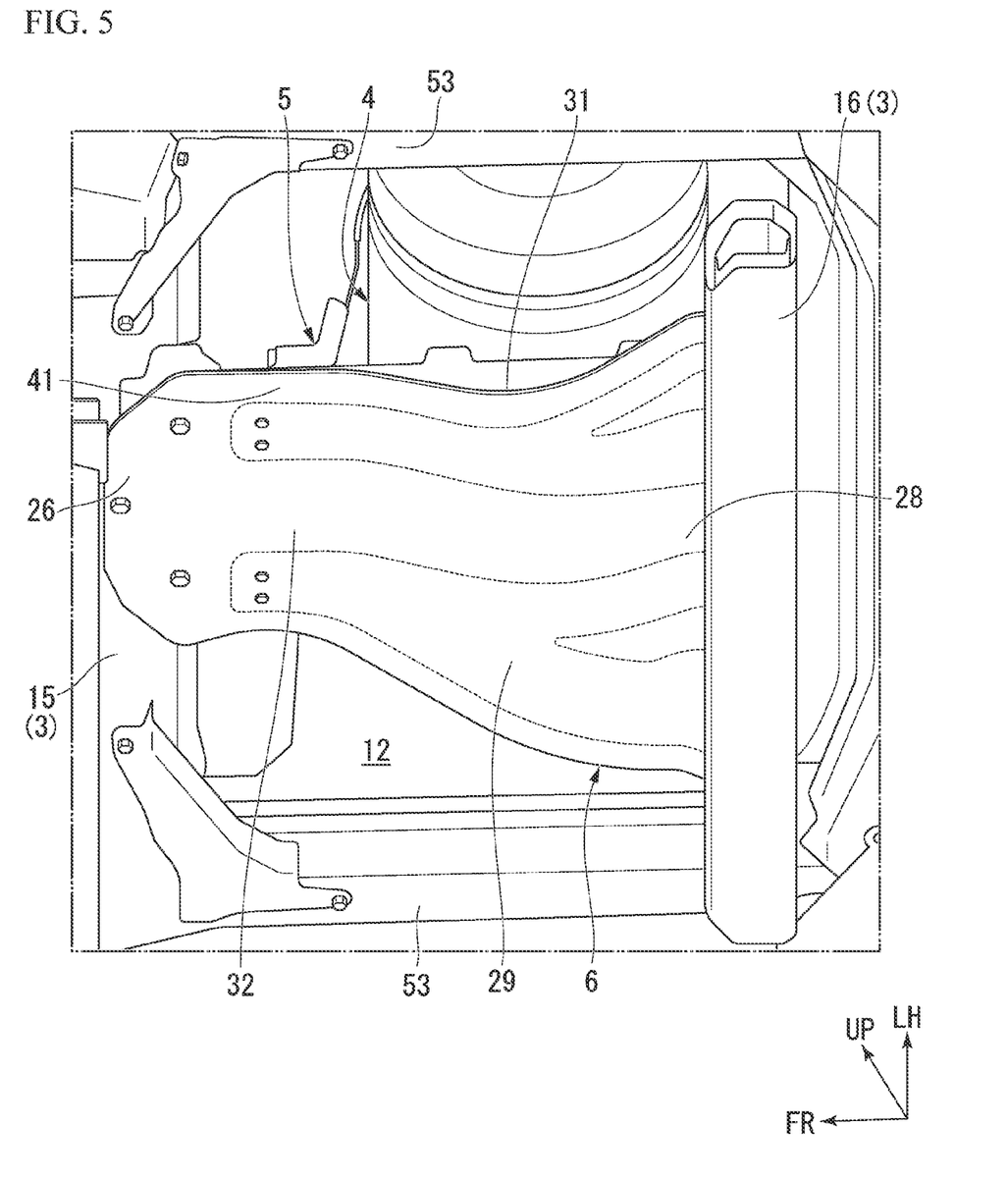
FIG. 5 is a perspective view showing a lower plate according to the embodiment from below.

FIG. 4 is a perspective view of the floor panel of FIG. 3, parts such as the upper band 5 or the like of which are not shown. FIG. 5 is a perspective view showing the lower plate 6 according to the embodiment from below, and FIG. 6 is a bottom view of the lower plate 6 according to the embodiment.

As shown in FIG. 2 and FIG. 4, the lower plate 6 is provided below the tanks 4. The lower plate 6 is formed in a plate shape, and provided to cover the opening 12 of the raised portion 11. As shown in FIG. 3, a width dimension W3 of the lower plate 6 in the vehicle width direction is greater than a width dimension W2 of the upper band 5 in the vehicle width direction (W3>W2). The lower plate 6 is provided in a smaller number than the upper band 5. In the embodiment, the lower plate 6 is provided by one.

Figure 6:
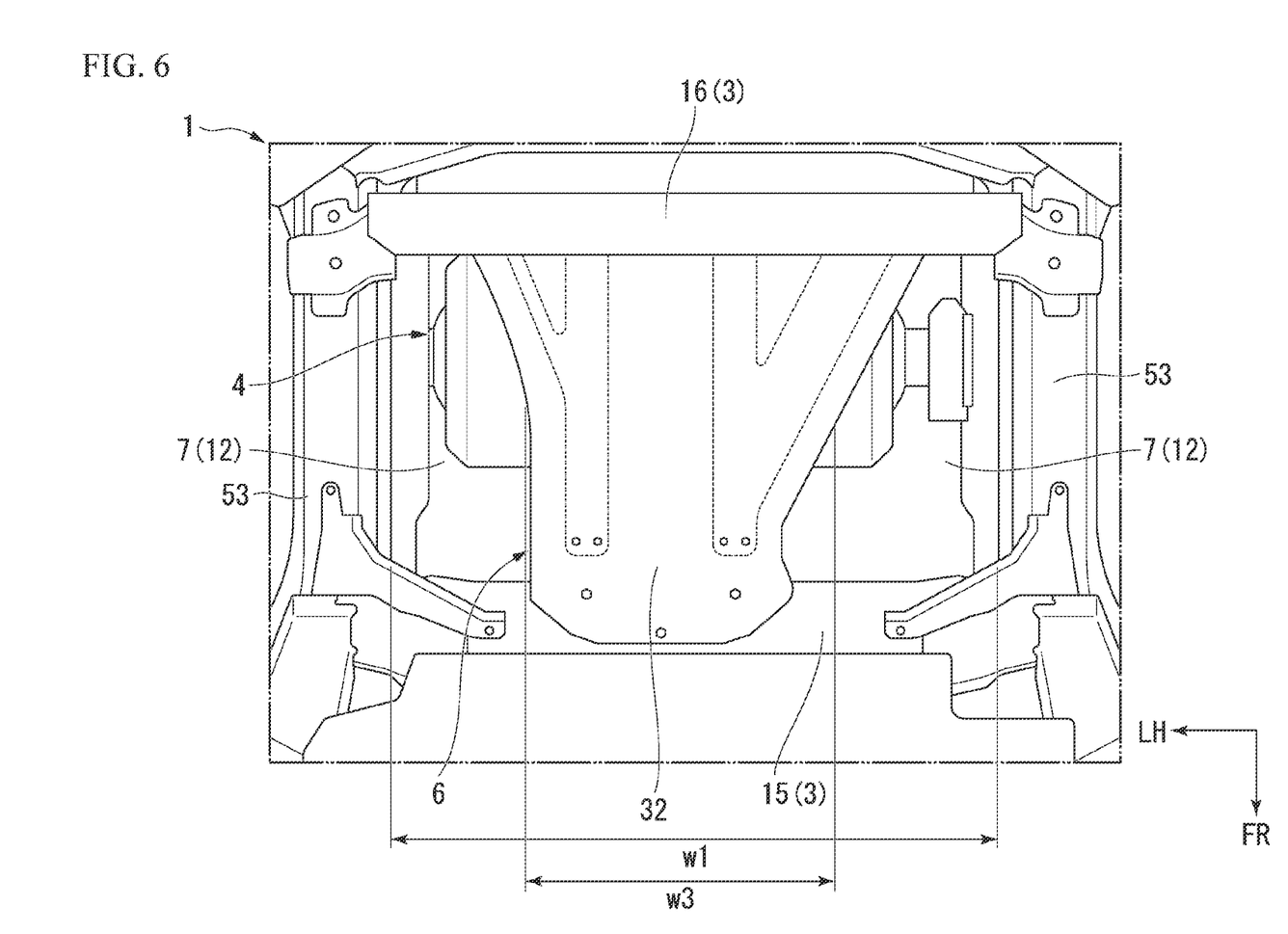
FIG. 6 is a bottom view of the lower plate according to the embodiment.

As shown in FIG. 6, when seen from below, the lower plate 6 is formed in a trapezoidal shape in which the width dimension W3 is gradually increased in the vehicle width direction as it goes from the front side toward the rear side. However, even at any position in the forward/rearward direction, the width dimension W3 of the lower plate 6 is smaller than a width dimension W1 of the opening 12 formed in the floor panel 2 (W3<W1). As shown in FIG. 2, a curved portion 29 is provided in a central portion of the lower plate 6 in the forward/rearward direction. The curved portion 29 is curved to protrude downward along a shape of an outer circumferential portion of the tank 4 when seen in a side view.

As shown in FIG. 5, a front end portion 26 and a rear end portion 28 of the lower plate 6 are attached to the pair of cross members 3, respectively. Specifically, the front end portion 26 of the lower plate 6 is attached to the front cross member 15 from below, and fixed to the front cross member 15 by a fastening member such as a bolt or the like. The rear end portion 28 of the lower plate 6 is attached to the rear cross member 16 from above, and fixed to the rear cross member 16 by a fastening member such as a bolt or the like. Further, as shown in FIG. 4, in the lower plate 6, the rear end portion 28 wider than the front end portion 26 is fastened to the rear cross member 16 by bolts 55. The plurality of bolts 55 configured to fasten the lower plate 6 and the rear cross member 16 are provided at intervals in the vehicle width direction.

As shown in FIG. 2, the lower plate 6 is formed by overlapping the plurality of plate members in the thickness direction (the upward/downward direction). In the embodiment, the lower plate 6 has two plate members of a first plate member 31 and a second plate member 32. The first plate member 31 is located on the side of the tanks 4 (the upper side). The second plate member 32 is disposed below the first plate member 31. The first plate member 31 and the second plate member 32 are formed to have the same appearance (i.e., the trapezoidal shape shown in FIG. 6) when seen in a plan view perpendicular to the surface direction.

As shown in FIG. 5, the second plate member 32 located on the lower side is formed in a flat plate shape, an unevenness of a top surface of which is relatively small. Further, dotted lines in FIG. 5 and FIG. 6 are lines that indicate a ridge of a convex portion 42 formed on the first plate member 31 and cannot be visually recognized from below in actuality. The second plate member 32 is formed by pressing a metal material such as aluminum alloy, iron, stainless steel, or the like.

As shown in FIG. 2 and FIG. 4, the first plate member 31 located on the upper side has a thickness greater than that of the second plate member 32. The first plate member 31 is formed by pressing a metal material such as aluminum alloy, iron, stainless steel, or the like. As shown in FIG. 4, the first plate member 31 is formed in a plate shape with a larger amount of unevenness on the top surface than that in the second plate member 32. The first plate member 31 has a base portion 41, the convex portion 42, a weight-reducing portion 44 and a drain hole 48.

The base portion 41 is a portion along the top surface of the second plate member 32 and a portion located below the first plate member 31. In a state in which the first plate member 31 and the second plate member 32 overlap each other, the base portion 41 of the first plate member 31 comes into contact with the upper surface of the second plate member 32.

The convex portion 42 protrudes upward from the base portion 41. In the embodiment, the convex portion 42 is provided by two arranged in the vehicle width direction. The convex portions 42 are provided at positions corresponding to the two upper bands 5 in the vehicle width direction, respectively. Each of the convex portions 42 extends in the forward/rearward direction. When seen from above, each of the convex portions 42 is formed in a Y shape that divides into two from the front side to the rear side (see also FIG. 6). In other words, the convex portion 42 branches rearward from a branch portion 47 in the middle of the convex portion 42 in the forward/rearward direction as a starting point.

The convex portion 42 has a thickness greater than the portion of the first plate member 31 other than the convex portion 42 (the base portion 41). As a method of increasing the thickness of the convex portion 42, for example, a method of attaching a patch to the convex portion 42 after pressing is exemplified. Further, as another method, for example, the thickness of the convex portion 42 may be increased by forming the first plate member 31 through casting, and press molding may be performed such that the thickness differs between the base portion 41 and the convex portion 42.

A plurality of bolts 56 configured to connect the upper bands 5 pass through the front portion and the rear portion of the convex portion 42. The upper bands 5 (see FIG. 3) are fastened and fixed to the upper surface of the convex portion 42 using the bolts 56. The bolts 56 configured to connect the upper bands 5 are provided in front of the bolts 55 configured to connect the lower plate 6 to the rear cross member 16. The bolts 55 configured to connect the lower plate 6 to the rear cross member 16 are also provided on the convex portion 42.

The weight-reducing portion 44, which is the inner circumferential portion of the lower plate 6, is provided on a portion disposed between the two upper bands 5. The weight-reducing portion 44 is provided on the base portion 41. The weight-reducing portion 44 passes through the base portion 41 of the first plate member 31 in the thickness direction. The weight-reducing portion 44 is formed in a rectangular shape elongated in the forward/rearward direction when seen from above.

The drain hole 48 is provided at a position corresponding to the branch portion 47. The drain hole 48 is provided in the base portion 41. The drain hole 48 passes through the base portion 41 in the thickness direction. The drain hole 48 is a circular hole. Water droplets collected between the tanks 4 and the lower plate 6 are discharged from a space between the tanks 4 and the lower plate 6 through the drain hole 48.

As shown in FIG. 3, a holding member 33 is attached to the upper surface of the first plate member 31 in addition to the upper bands 5. The holding member 33 is provided at a position on the upper surface of the lower plate 6 and corresponding to each of the upper bands 5 in the vehicle width direction. The holding member 33 has a receiving portion 51. The receiving portion 51 is disposed between the lower plate 6 and the tank 4 and corresponds to the outer circumferential portion of the tank 4. The receiving portion 51 functions as a shock-absorbing member when the tank 4 is fixed. Accordingly, the tank 4 is sandwiched by the lower plate 6 and the upper band 5 in the upward/downward direction, and the tank 4 is securely fixed. Further, when the tank 4 having the same size as that of the space between the upper band 5 and the lower plate 6 is installed, the holding member 33 may be omitted. Alternatively, only the receiving portion 51 may be provided. That is, the holding member 33 may be provided only when the tank 4 smaller than the space surrounded by the upper band 5 and the lower plate 6 is provided. The holding member 33 may be provided on the side of the upper band 5.

A procedure of attaching the tank 4 to the vehicle using the upper band 5 and the lower plate 6 is as follows. First, the holding member 33 is attached to the lower plate 6 before being attached to the vehicle body. Next, in a state in which the tank 4 is disposed on the upper surface of the lower plate 6, the upper band 5 and the lower plate 6 are fastened to cover the tank 4 from above. Further, the lower plate 6 to which the tank 4 and the upper band 5 are attached is connected to the floor panel 2, the front cross member 15 and the rear cross member 16 of the vehicle body. Accordingly, the tank 4 is attached to (mounted on) the vehicle.

(Accommodating Section)

As shown in FIG. 6, in a state in which the lower plate 6 is attached to the vehicle body, the width dimension W3 of the lower plate 6 is smaller than the width dimension W1 of the opening 12 in the floor panel 2. The accommodating section 7 is provided between both sides of the opening 12 and the lower plate 6 in the vehicle width direction. In other words, the accommodating section 7 is a portion of the opening 12 that is not covered with the lower plate 6. In-vehicle parts such as a suspension or the like are accommodated in the accommodating section 7.

(Actions and Effects)

Next, actions and effects of the tank attachment structure 1 will be described.

According to the tank attachment structure 1 of the embodiment, the tanks 4 are disposed below the floor panel 2, and the tanks 4 are sandwiched between the plurality of upper bands 5 and the lower plate 6 in the upward/downward direction. The front end portion 26 and the rear end portion 28 of the lower plate 6 are attached to the pair of cross members 3, respectively. Accordingly, the tanks 4 can be fixed to the vehicle body.

The floor panel 2 has the raised portion 11 and the opening 12, and the lower plate 6 is provided to cover the opening 12 of the floor panel 2. Further, the lower plate 6 is provided with a larger width than that of the upper band 5 in the vehicle width direction, and is provided by the number smaller than that of the upper bands 5. When the opening 12 is covered with the lower plate 6 wider than the upper band 5, rigidity of the floor panel 2 in the vicinity of the opening 12 can be increased. In particular, rigidity of the floor panel 2 with respect to a load in the lateral direction generated upon turning can be increased. Accordingly, for example, even when the structure is applied to the vehicle in which the space of the passenger compartment 9 and the space of the cargo compartment 10 are continuous with each other, rigidity of the rear portion of the floor panel 2 can be sufficiently highly maintained without separately providing a reinforcement member. Accordingly, in particular, deformation of the floor panel 2 in the vicinity of the opening 12 when the load in the lateral direction is applied is minimized, and as a result, and ride quality and operation stability of the occupant can be improved. Further, since the rigidity of the floor panel 2 is increased, the raised portion 11 can be provided on the floor panel 2. Accordingly, since the tank 4 can be accommodated inside the raised portion 11, a space under the floor can be effectively used.

Further, since the front end portion 26 and the rear end portion 28 of the lower plate 6 are attached to the cross member 3 with high rigidity, the lower plate 6 can be strongly fixed. Accordingly, rigidity of the floor panel 2 in the vicinity of the opening 12 can be further increased.

Accordingly, it is possible to provide the tank attachment structure 1 capable of increasing rigidity of the floor panel 2 and improving ride quality and operation stability of an occupant even when the structure is applied to the vehicle in which the passenger compartment 9 and the cargo compartment 10 are continuous.

The lower plate 6 is constituted by the plurality of plate members (in the embodiment, the first plate member 31 and the second plate member 32). In the plurality of plate members, a thickness of the plate member located on the side of the tank 4 (the first plate member 31) is thickest. Accordingly, the thickness of each of the first plate member 31 that receives the load of the tank 4 and the second plate member 32 that does not receive the load can be appropriately set, and reduction in weight of the lower plate 6 as a whole can be achieved. Further, the load of the tank 4 can be received more stably by increasing the thickness of the first plate member 31 that receives the load of the tank 4. Accordingly, both of reduction in weight and guarantee of rigidity can be achieved.

The weight-reducing portion 44 is provided in the portion that is the inner circumferential portion of the lower plate 6 and located between the plurality of upper bands 5. A decrease in rigidity can be prevented by reducing the weight of the portion that does not directly receive the load of the tank 4, and further reduction in weight of the lower plate 6 can be achieved.

The lower plate 6 is formed such that the width dimension W3 in the vehicle width direction is increased from the front side toward the rear side. Accordingly, an area of the lower plate 6 can be increased, and rigidity of the floor panel 2 in the lateral direction in the vicinity of the opening 12 can be increased. The width dimension W3 of the rear end portion 28 is increased in comparison with the front end portion 26, and thus, in particular, rigidity of the floor rear portion, rigidity of which is easily decreased, can be increased. Accordingly, rigidity of the floor panel 2 can be effectively improved. Since the end portion of the lower plate 6 in the vehicle width direction is an oblique line, for example, the load transmitted from the lower plate 6 to the cross member 3 is distributed in the forward/rearward direction and the vehicle width direction. Accordingly, the load generated in the vicinity of the opening 12 of the floor panel 2 can be efficiently transmitted to the cross member 3. Accordingly, deformation of the lower plate 6 and the floor panel 2 can be effectively minimized.

The lower plate 6 has the convex portion 42, and the convex portion 42 is formed in a Y shape divided into two from the front side toward the rear side. Accordingly, the load in the lateral direction can be effectively distributed not only by the oblique lines of both sides of the lower plate 6 in the vehicle width direction but also by the convex portion 42. Accordingly, rigidity of the lower plate 6 can be more effectively increased, and the load in the lateral direction can be supported. Since the convex portion 42 is formed in the Y shape, in the rear end portion 28 of the lower plate 6 having the width dimension W3 greater than that of the front end portion 26, more parts with high rigidity can be provided. Accordingly, rigidity of the lower plate 6 can be increased through the entire surface thereof.

The plurality of plate members that constitute the lower plate 6 have the first plate member 31 located on the side of the tank 4, and the second plate member 32 located below the first plate member 31. The first plate member 31 has the convex portion 42 protruding upward at a position corresponding to the upper band 5 in the vehicle width direction. When the convex portion 42 is provided on the first plate member 31, a load of the tank 4 can be received by an apex portion (an upper surface) of the convex portion 42. Since the convex portion 42 is provided at the position corresponding to the upper band 5, the tanks 4 can be held in the upward/downward direction at substantially the same position in the vehicle width direction. Accordingly, in comparison with the case in which the upper band 5 and the lower plate 6 hold the tanks 4 from different positions in the vehicle width direction, the tanks 4 can be stably held. Accordingly, fixing strength of the tanks 4 can be improved.

The first plate member 31 has a complex shape having the convex portion 42, and the second plate member 32 has a flat shape. For this reason, a mold configured to form the second plate member 32 can have a simple configuration. Accordingly, manufacturing properties can be improved and manufacturing costs can be minimized. Further, since the lower plate 6 is constituted by the plurality of members, the thickness of each plate member can be thinned. Accordingly, even in the manufacturing of the first plate member 31 having the complex shape in comparison with the second plate member 32, manufacturing can be easily performed in comparison with the case in which the thickness is great. Further, in comparison with the case in which the lower plate 6 is constituted by one plate member with a great thickness, the weight of the lower plate 6 can be reduced as a whole.

The thickness of the convex portion 42 of the first plate member 31 is greater than that of the portion of the first plate member 31 other than the convex portion 42. The load of the tanks 4 can be more stably supported by increasing the thickness of the convex portion 42 that receives the load of the tanks 4. Accordingly, fixing strength of the tanks 4 can be improved. On the other hand, since the portion other than the convex portion 42 is thinner than the convex portion 42, an excessive increase in weight can be minimized. Accordingly, fixing strength of the tanks 4 can be improved while minimizing an increase in weight by increasing only the thickness of the necessary portion.

The tank attachment structure 1 is applied to the vehicle in which the space of the passenger compartment 9 in which an occupant gets and the space of the cargo compartment 10 located behind the passenger compartment 9 are continuous. Accordingly, in particular, it can be the tank attachment structure 1 useful when applied to the vehicle in which the rigidity of the floor rear portion tends to decrease. Specifically, for example, even when guarantee of rigidity of the floor panel 2 due to the reinforcement member or the like is difficult (a degree of arrangement freedom of the reinforcement member is low), deformation of the floor panel 2 in the vicinity of the opening 12 with respect to the load in the lateral direction can be effectively minimized, and ride quality of an occupant can be improved.

The holding member 33 is attached to the upper surface of the first plate member 31. Accordingly, for example, even when the size of the tank 4 is changed, the tanks 4 can be stably held by the upper band 5 and the lower plate 6. In other words, the upper band 5 and the lower plate 6 can be used regardless of the size of the tank 4. Accordingly, versatility of the tank attachment structure 1 can be improved.

At least one of the pair of front and rear cross members 3 is detachably attached to the vehicle body member (the floor panel 2 or the side sills 53). Accordingly, the cross member 3 can be attached to the opening 12 of the floor panel 2 at an arbitrary position in the forward/rearward direction upon manufacturing. That is, for example, in comparison with the case in which the cross member 3 is fixed to the floor panel 2 or the side sills 53 through fusion or the like, the degree of arrangement freedom of the cross member 3 can be increased. Accordingly, for example, rigidity of the floor panel 2 can be adjusted to an appropriate magnitude by adjusting a position of the cross member 3 according to the size of the tank 4, the size of the opening 12, or the like. Accordingly, versatility of the tank attachment structure 1 can be improved.

The width dimension W1 of the opening 12 of the floor panel 2 is greater than the width dimension W3 of the lower plate 6. The accommodating section 7 is provided between both sides of the opening 12 in the vehicle width direction and the lower plate 6. The accommodating section 7 is provided at a position corresponding to the opening 12 of the floor panel 2. Accordingly, the region in the vicinity of the opening 12 can be used as the accommodating section 7. In-vehicle parts such as a suspension or the like are accommodated in the accommodating section 7. Accordingly, the configuration of the rear portion of the vehicle body can be made compact effectively using the space in the vicinity of the opening 12. Further, the degree of design freedom in the rear portion of the vehicle body can be improved.

Further, the technical scope of the present invention is not limited to the above-mentioned embodiment and various modifications may be made without departing from the spirit of the present invention.

For example, in the above-mentioned embodiment, the cross member 3 may further include a cross member disposed in front of the small raised portion 13.

The lower plate 6 may have three or more plate members. In this case, it is desirable to form each plate member such that the thickness of the plate member located on the side of the tank 4 is greatest.

In-vehicle parts other than a suspension or the like can be accommodated in the accommodating section 7.

The lower plate 6 may also be fastened to the floor panel 2 using, for example, the bolt 55.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

1 Tank attachment structure
2 Floor panel
3 Cross member
4 Tank
5 Upper band
6 Lower plate
7 Accommodating section
9 Passenger compartment 10 Cargo compartment
11 Raised portion
12 Opening
26 Front end portion (of lower plate)
28 Rear end portion (of lower plate)
31 First plate member (plurality of plate members, plate member located on side of tank)
32 Second plate member (plurality of plate members)
41 Base portion (portion other than convex portion)
42 Convex portion
44 Weight-reducing portion
W1 Width dimension of opening
W3 Width dimension of lower plate

What is claimed is:

1. A tank attachment structure comprising:
a floor panel having a raised portion protruding toward a passenger compartment and an opening directed downward;
a tank disposed inside the raised portion;
a plurality of upper bands configured to cover the tank from above;
a lower plate provided below the tank and connected to the upper bands; and
a pair of cross members provided in front of and behind the tank and extending in a vehicle width direction of a vehicle,
wherein the lower plate has a width dimension greater than that of the upper bands in the vehicle width direction and is provided to be fewer in number than the upper bands to cover the opening, and a front end portion and a rear end portion of the lower plate are each attached to the pair of cross members,
wherein the lower plate is formed by overlapping a plurality of plate members in a thickness direction, and
in the plurality of plate members, the thickness of each plate member located on a side of the tank is greatest.

2. The tank attachment structure according to claim 1, wherein, when seen in a plan view in a direction perpendicular to a surface direction of the lower plate, a weight-reducing portion that is an inner circumferential portion of the lower plate is provided on a portion located between the plurality of upper bands.

3. The tank attachment structure according to claim 1, wherein the lower plate is formed such that a width dimension in the vehicle width direction is increased from a front side toward a rear side.

4. The tank attachment structure according to claim 1, wherein the plurality of plate members are constituted by:
a first plate member located on the side of the tank; and
a second plate member located below the first plate member,
the first plate member has a convex portion protruding upward at a position corresponding to the upper bands in the vehicle width direction, and
the second plate member is formed flat.

5. The tank attachment structure according to claim 4, wherein a thickness of the convex portion is greater than that of a portion of the first plate member other than the convex portion.

6. The tank attachment structure according to claim 1, wherein at least one of the pair of cross members is detachably attached to a vehicle body member.

7. The tank attachment structure according to claim 1, wherein a width dimension of the opening of the floor panel in the vehicle width direction is greater than that of the lower plate in the vehicle width direction, and
an accommodating section in which in-vehicle parts are accommodated is provided between both sides of the opening in the vehicle width direction and the lower plate.

8. A tank attachment structure comprising:
a floor panel having a raised portion protruding toward a passenger compartment and an opening directed downward;
a tank disposed inside the raised portion;
a plurality of upper bands configured to cover the tank from above;
a lower plate provided below the tank and connected to the upper bands; and
a pair of cross members provided in front of and behind the tank and extending in a vehicle width direction of a vehicle,
wherein the lower plate has a width dimension greater than that of the upper bands in the vehicle width direction and is provided to be fewer in number than the upper bands to cover the opening, and a front end portion and a rear end portion of the lower plate are each attached to the pair of cross members,
wherein the lower plate has a convex portion protruding upward, and
the convex portion is formed in a Y shape divided into two from a front side toward a rear side.

* * * * *